(12) United States Patent  (10) Patent No.: US 6,205,757 B1
Dow et al.  (45) Date of Patent: Mar. 27, 2001

(54) WINDROW MERGING MACHINE AND METHOD OF MERGING WINDROWS

(75) Inventors: Steven S. Dow, Byron; Hubert A. Wick, Warsaw, both of NY (US)

(73) Assignee: Byron Enterprises, Inc., Byron, NY (US)

( * ) Notice: Subject to any disclaimer, the term of this patent is extended or adjusted under 35 U.S.C. 154(b) by 0 days.

(21) Appl. No.: 09/255,209

(22) Filed: Feb. 22, 1999

Related U.S. Application Data

(63) Continuation-in-part of application No. 09/253,486, filed on Feb. 19, 1999, now abandoned.

(51) Int. Cl.[7] ................................................. A01D 78/00
(52) U.S. Cl. ......................................................... 56/366
(58) Field of Search ............................. 56/345, 344, 354, 56/355, 358, DIG. 21, 370, 376, 365, 366, 375

(56) References Cited

U.S. PATENT DOCUMENTS

| | | | |
|---|---|---|---|
| 1,877,770 | * 9/1932 | Larson | 56/376 |
| 2,343,583 | * 3/1944 | Rogers | 56/345 |
| 3,695,015 | * 10/1972 | Twidale et al. | 56/181 |
| 3,714,766 | * 2/1973 | Ender et al. | 56/364 |
| 4,738,092 | 4/1988 | Jennings | 56/372 |
| 4,793,129 | 12/1988 | Ehrhart et al. | 56/370 |
| 4,910,951 | * 3/1990 | Reilly et al. | 56/376 |
| 5,111,636 | 5/1992 | Quirin | 56/367 |
| 5,155,986 | 10/1992 | Kelderman | 56/365 |
| 5,163,277 | 11/1992 | Fransgaard | 56/366 |
| 5,177,944 | * 1/1993 | Finlay | 56/365 |
| 5,203,154 | * 4/1993 | Lesher et al. | 56/366 |
| 5,507,139 | * 4/1996 | Delperdang et al. | 56/366 |

* cited by examiner

*Primary Examiner*—Robert E. Pezzuto
(74) *Attorney, Agent, or Firm*—Joseph P. Gastel

(57) ABSTRACT

A windrow gathering machine including a main frame, first and second combined pickup and conveyor units pivotally mounted on skewed axes on opposite sides of the main frame, for movement between substantially horizontal operating positions and inclined vertical stowed positions, first motors for driving the conveyors in the same and opposite directions, second motors for moving the combined pickup and conveyor units between the operating and stowed positions, third motors for moving the combined pickup and conveyor units transversely of the main frame, and mountings for moving only the conveyors relative to each other and relative to the pickups of the combined pickup and conveyor units. A method of merging windrows including the steps of lifting first and second adjacent windrows and conveying them in opposite directions and depositing them proximate to third and fourth windrows to create two double windrows, or alternatively, lifting spaced windrows and conveying them in the same direction and depositing them relative to a third windrow to create a triple windrow.

61 Claims, 15 Drawing Sheets

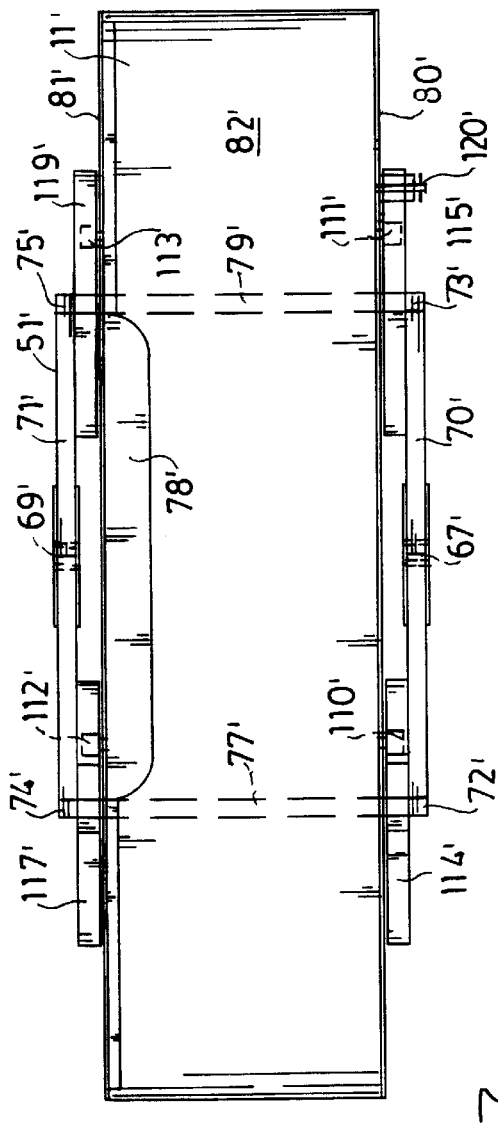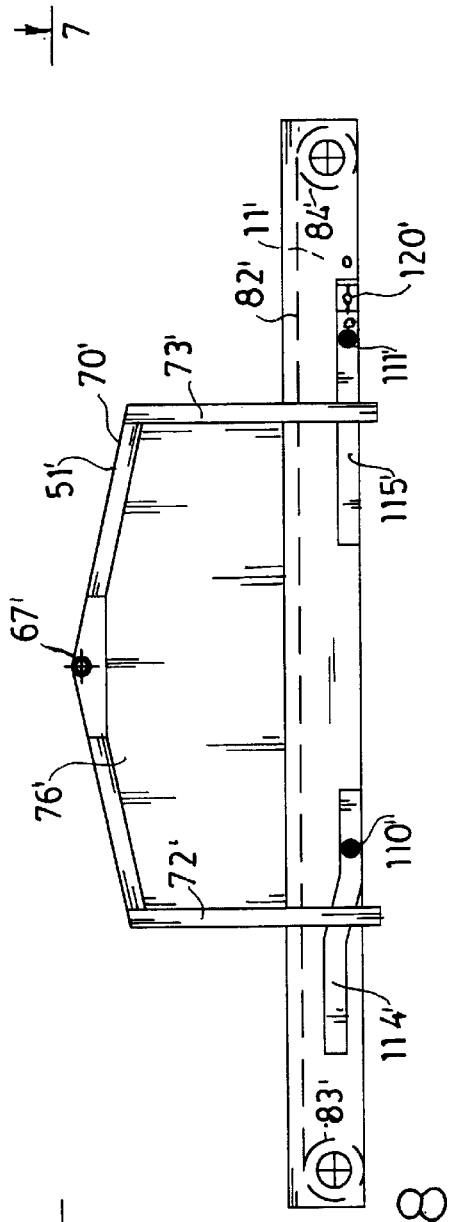

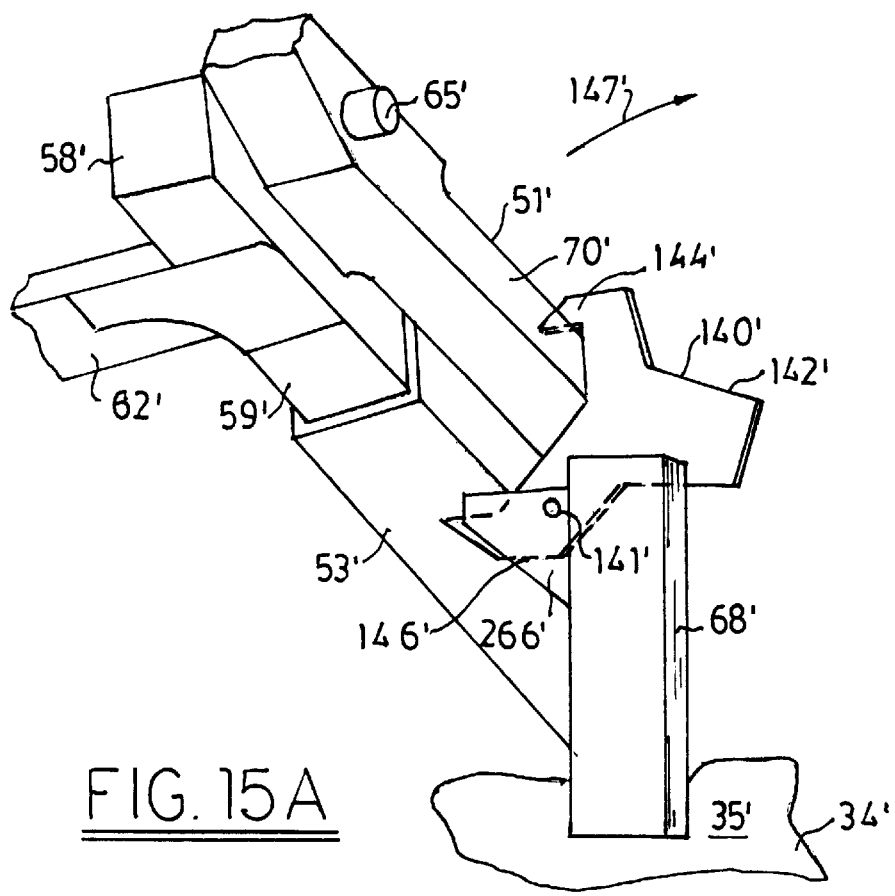
FIG. 15A
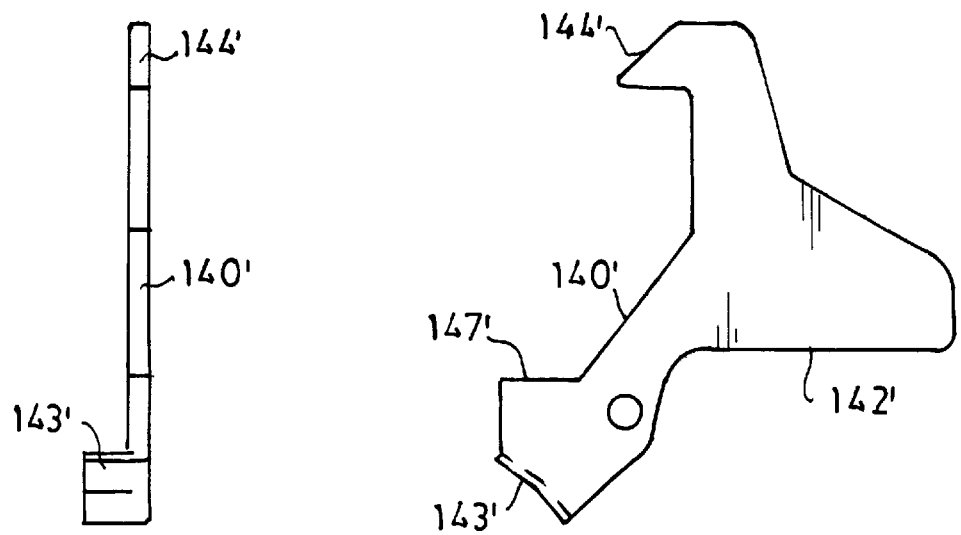
FIG. 15C
FIG. 15B

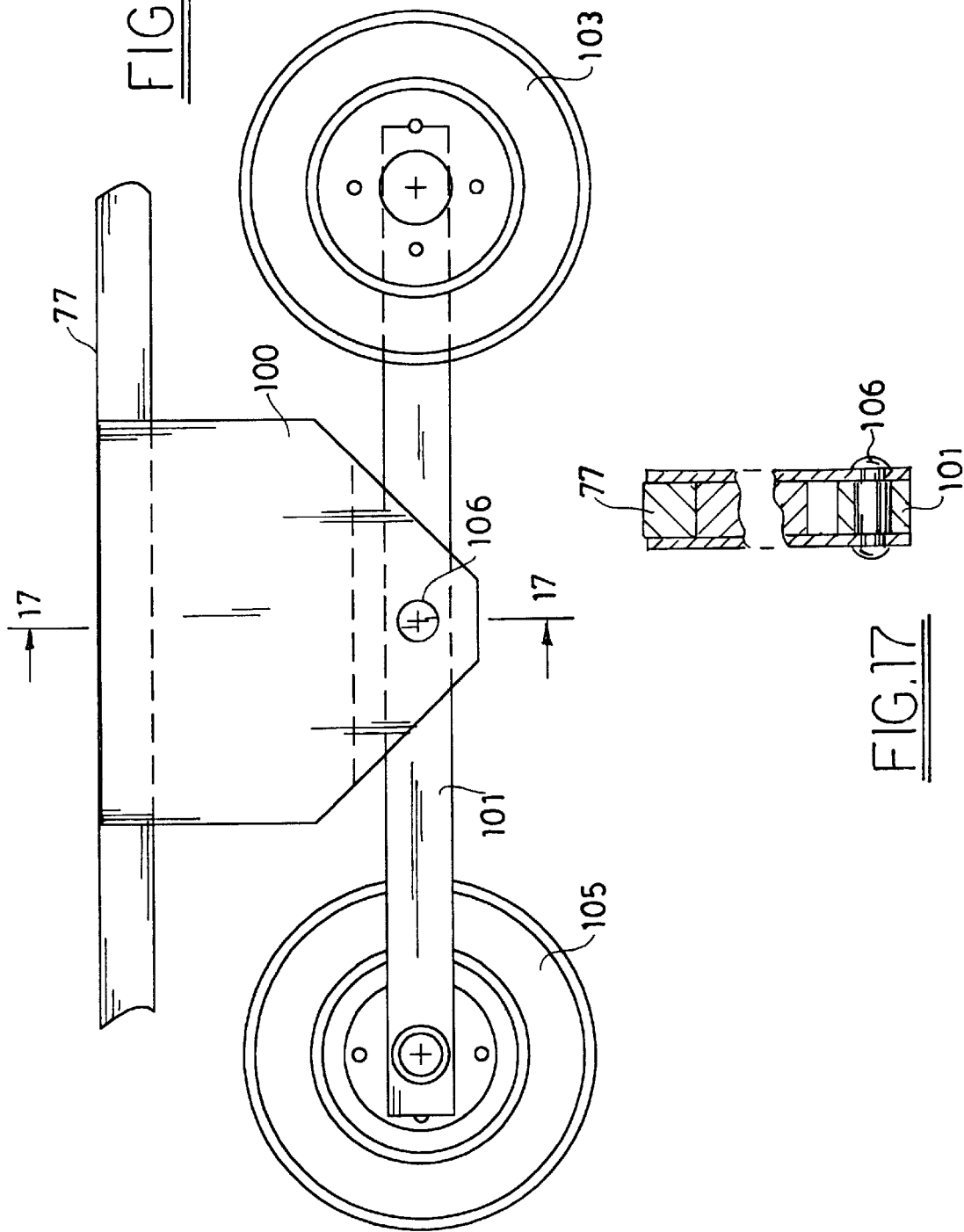

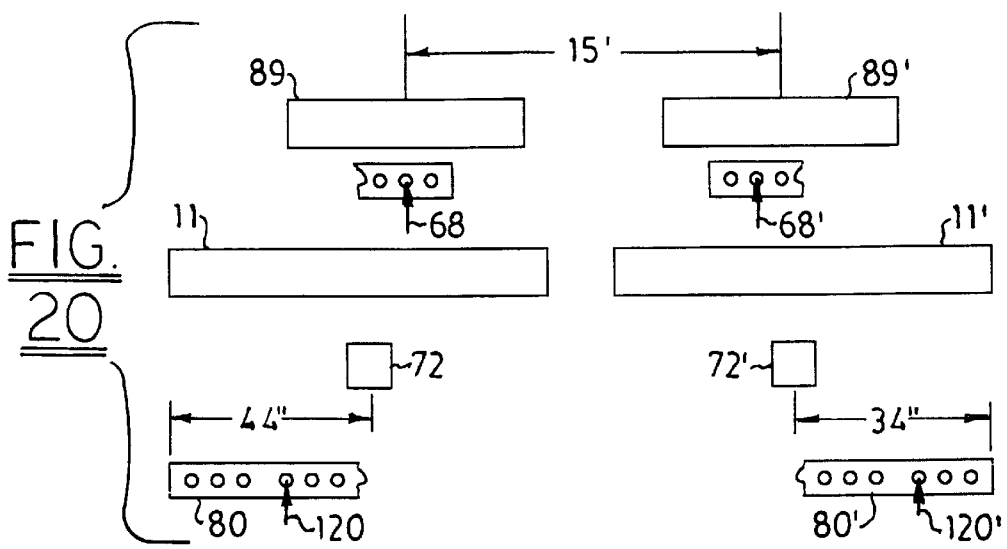
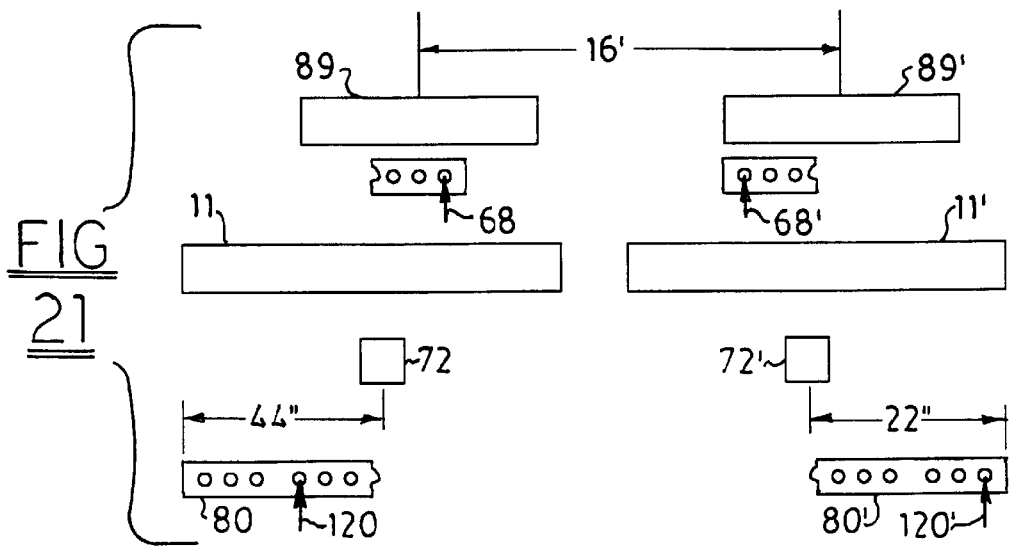
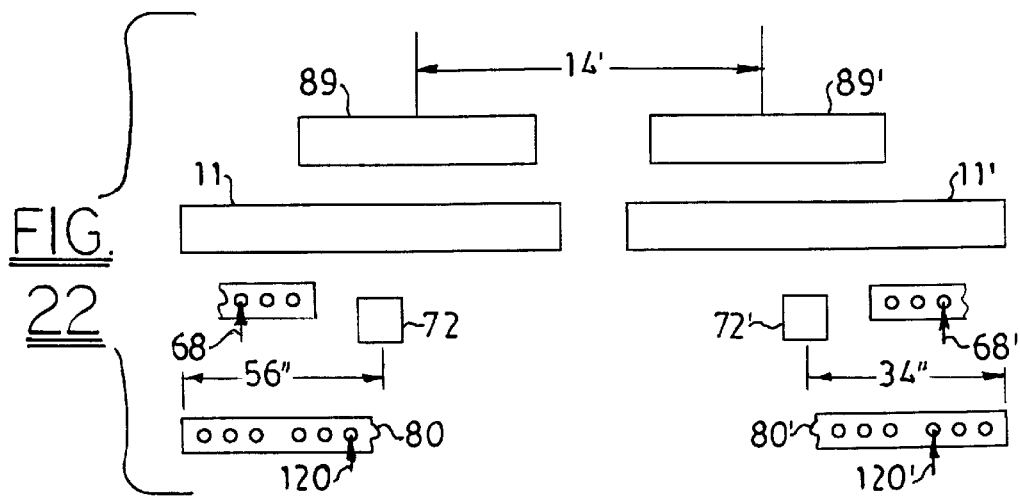

WINDROW MERGING MACHINE AND METHOD OF MERGING WINDROWS

CROSS-REFERENCE TO RELATED APPLICATIONS

The present application is a continuation-in-part of application Ser. No. 09/253,486, filed Feb. 19, 1999 (now abandoned).

STATEMENT REGARDING FEDERALLY SPONSORED RESEARCH OR DEVELOPMENT

Not Applicable

BACKGROUND OF THE INVENTION

The present invention relates to an improved windrow merging machine and to an improved method of merging windrows.

By way of background, machines for merging windrows are known in the art, and some machines of this type are shown in U.S. Pat. Nos. 5,155,986, 5,163,277 and 5,177, 944. However, no single machine of the foregoing patents has the capability of positively lifting windrows off of the ground, combining a plurality of windrows into numerous different combinations of merged windrows, adjusting the machine for merging windrows located on different centers and also pivoting windrow pickup and conveying units from their horizontal operating positions to vertical stowed positions for transport.

BRIEF SUMMARY OF THE INVENTION

It is accordingly one object of the present invention to provide an improved windrow merging machine which positively lifts adjacent windrows from the ground and conveys them either in the same direction or in opposite directions and merges them with windrows on the ground.

Another object of the present invention is to provide an improved machine for merging windrows which has separate combined windrow pickup and conveying units mounted on opposite sides of a main frame and in which the conveyors can operate in the same direction whereby one conveyor deposits a picked up windrow onto another conveyor so that two windrows are discharged from the machine.

A further object of the present invention is to provide a windrow merging machine as described in either of the previously two objects wherein combined windrow pickup and conveying units are movable between substantially horizontal operating positions and vertically inclined stowed positions.

A still further object of the present invention is to provide an improved windrow merging machine which can be adjusted to various positions laterally of the main frame of the machine to thereby compensate for different spacings between windrows.

Yet another object of the present invention is to provide an improved method of merging windrows into accumulations of different numbers of windrows. Other objects and attendant advantages of the present invention will readily be perceived hereafter.

The present invention relates to a windrow merging machine comprising a main frame, first and second pickup mechanisms mounted on opposite sides of said main frame, and first and second conveyors mounted on opposite sides of said main frame proximate said first and second pickup mechanisms, respectively.

The present invention also relates to a windrow merging machine as set forth in the preceding paragraph wherein the pickup mechanisms and the conveyors are adjustable for merging differently spaced windrows.

The present invention also relates to a windrow merging machine which includes structure for moving combined pickup and conveyor units between horizontal operating positions and vertical stowed positions.

The present invention also relates to a method of merging windrows which are positioned in spaced rows comprising the steps of lifting first and second adjacent windrows from the ground; conveying said first and second windrows in opposite directions; and depositing said first and second windrows proximate to third and fourth windrows, respectively, which are adjacent to said first and second windrows, respectively, to thereby create a first accumulation consisting of said first and third windrows and a second accumulation consisting of said second and fourth windrows.

The present invention also relates to a method of merging windrows which are positioned in spaced rows which extend in substantially the same direction comprising the steps of lifting first and second adjacent windrows from the ground and depositing them onto a third windrow to create a first accumulation of windrows; and thereafter raising fourth and fifth adjacent windrows which are adjacent onto said first accumulation of windrows and depositing them onto said first accumulation of windrows to thereby create a second accumulation of windrows consisting of said first, second, third, fourth and fifth windrows.

The various aspects of the present invention will be more fully understood when the following portions of the specification are read in conjunction with the accompanying drawings wherein:

BRIEF DESCRIPTION OF THE SEVERAL VIEWS OF THE DRAWING

FIG. 7 is a plan view of the conveyor portion of the combined pickup and conveyor unit taken substantially in the direction of arrows 7—7 of FIG. 8;

FIG. 8 is a side elevational view of the conveyor portion of the combined pickup and conveyor unit;

FIG. 15A is a view similar to FIG. 15 but showing a latch structure for latching the pickup-conveyor frame in a stowed position;

FIG. 15B is a side elevational view of the latch of FIG. 15A;

FIG. 15C is an end elevational view of the latch;

FIG. 16 is a fragmentary side elevational view of the mounting of a walking beam mounting;

FIG. 17 is a fragmentary cross sectional view taken substantially along line 17—17 of FIG. 16;

FIG. 20 is a schematic view of the adjustments of the various parts of the machine for merging windrows on fifteen foot centers;

FIG. 21 is a schematic view similar to FIG. 20 but with the machine adjusted for merging windrows on sixteen foot centers; and FIG. 22 is a schematic view similar to FIGS. 20 and 21 but showing the adjustments for windrows on fourteen foot centers.

DETAILED DESCRIPTION OF THE INVENTION

Figure 1:
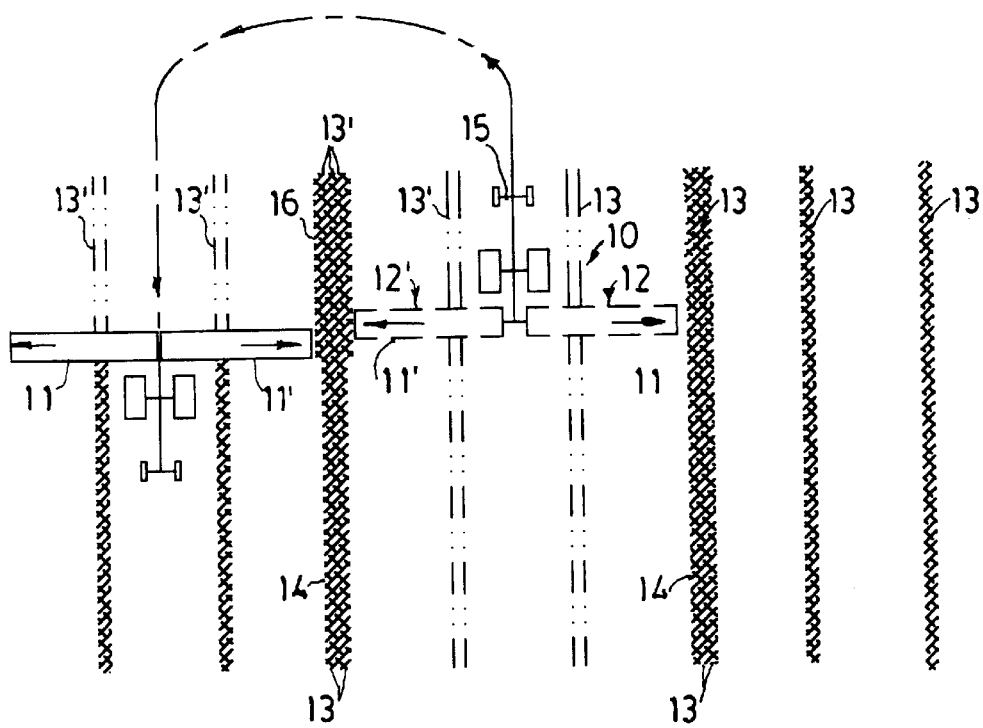
FIG. 1 is a schematic view of the manner in which the improved windrow merging machine operates to combine single windrows into double and triple windrows.

Summarizing briefly in advance, FIG. 1 discloses how the improved windrow merging machine 10 of the present invention can be operated with the conveyors 11 and 11' of the combined pickup and conveyor units 12 and 12', respectively, being driven in opposite directions to merge a single windrow 13 onto an adjacent single windrow 13 to create a double windrow 14 and to merge a single windrow 13' onto an adjacent single windrow 13' to create a double windrow 14' as the tractor 15 pulls the windrow merging machine 10 along the rows of windrows. In addition, when the machine 10 is driven to its solid line position in FIG. 1, a triple windrow 16 is created.

Figure 2:
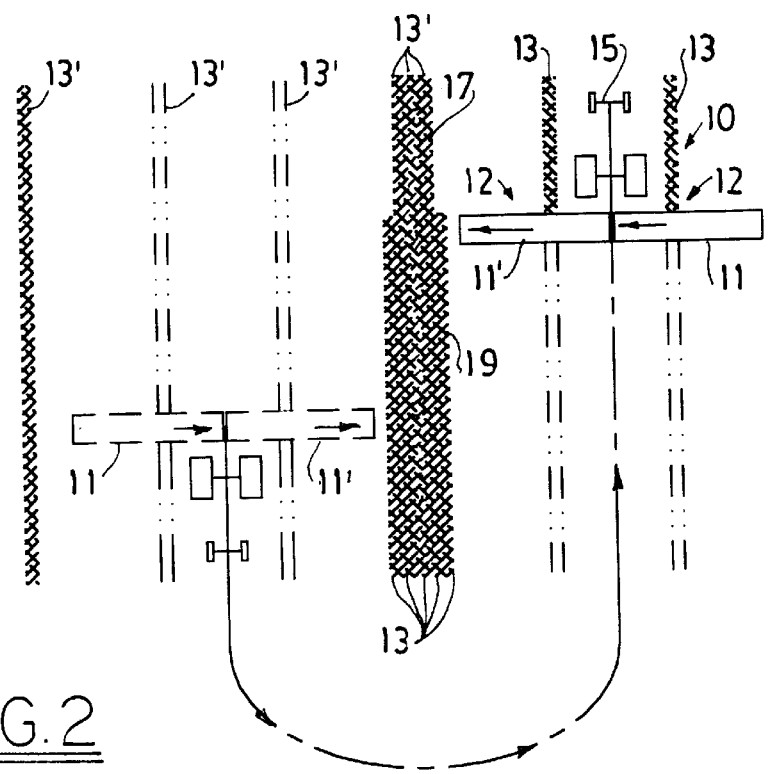
FIG. 2 is a schematic view in which the improved windrow merging machine initially produces a triple windrow and subsequently a quintuple windrow.
Figure 3:
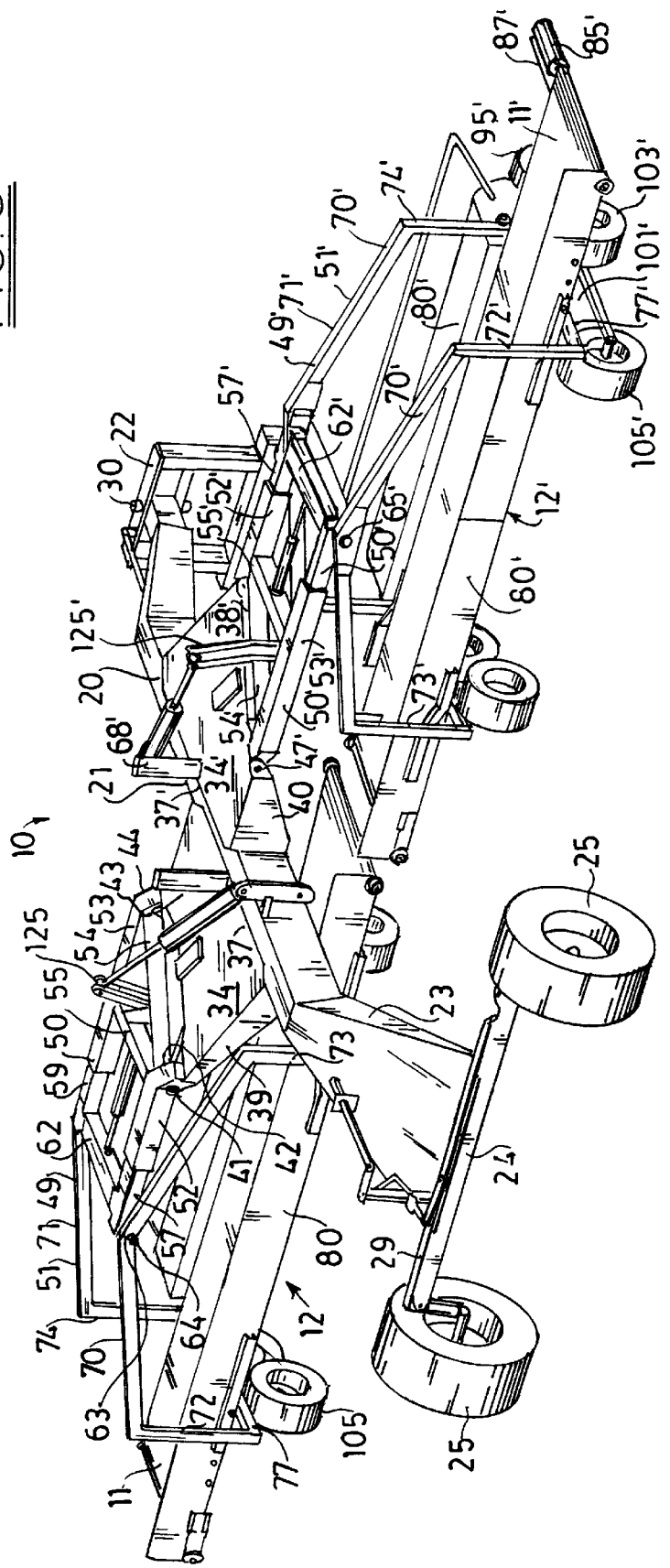
FIG. 3 is a rear perspective view of the improved windrow merging machine with its combined pickup and conveyor units extending laterally from the main frame in operating positions.

In FIG. 2 it is shown how the windrow merging machine 10 can be operated with its conveyors 11 and 11' being driven in the same direction so as to combine two adjacent windrows 13' and 13' and deposit them onto another windrow 13' so as to create a triple windrow 17'. Thereafter, the windrow merging machine 10 can be driven along the two additional windrows 13 to deposit them onto the triple windrow 17' to create a quintuple windrow 19.

It will also be appreciated that, if desired, double rows 14 and 14' of FIG. 1 can be converted to quadruple rows by driving the windrow merging machine 10 with its conveyors 11 and 11' in the same direction along two single rows such as 13' or two single rows such as 13 of FIG. 1 and depositing these rows onto double rows 14 or 14' so as to create quadruple windrows. The required size of the ultimate merged windrows, be they either double windrows, triple windrows, quadruple windrows or quintuple windrows, would depend on how these windrows are to be subsequently handled, either for baling or chopping or other types of handling or processing.

Summarizing further in advance, improved windrow merging machine 10 mounts the combined pickup and conveyor units 12 and 12' on main frame 20 so that they can be positioned in an aligned substantially mirror image horizontal positions for merging windrows or they can be mounted in inclined vertical stowed positions for transporting the machine 10 to its operating locations. At this point it is to be again noted that the combined pickup and conveyor units 12 and 12' when in their operating positions are substantial mirror image counterparts. Accordingly, generally only one of these units 12 or 12' will be specifically described with unprimed or primed numerals, respectively, and corresponding primed or unprimed numerals, respectively, will be applied to the other unit to denote corresponding structure, without specifically describing such structure. It is also to be noted that, in the interest of clarity, certain of the views do not show all of the structure of the merging machine 10, but it will be understood that all of the structure of the merging machine 10 is shown in the combination of views.

At this point it is to be noted that the term merge means that windrows are deposited next to each other or on top of each other or a combination of both, such that the merged windrows are sufficiently close to each other so that they can be processed by a baler or a chopper, or any other type of processing or handling machine.

The windrow merging machine 10 includes a main frame 20 having an elongated main portion 21 having a tractor hitch assembly 22 at its front end and an axle mounting portion 23 at its rear end which supports axle 24 on which rear wheels 25 are mounted. A steering linkage which includes rod 27 has its front end effectively connected to hitch assembly 22 and its rear end suitably connected to link 29 so that the rear wheels 25 will pivot in unison with the pivoting of hitch assembly 22 as it pivots about pin 30 as the tractor 15 which pulls machine 10 turns. The foregoing linkage for pivoting rear axle 24 is conventional and well known in the art and therefore a further description of its specific details will not be made.

Figure 6:
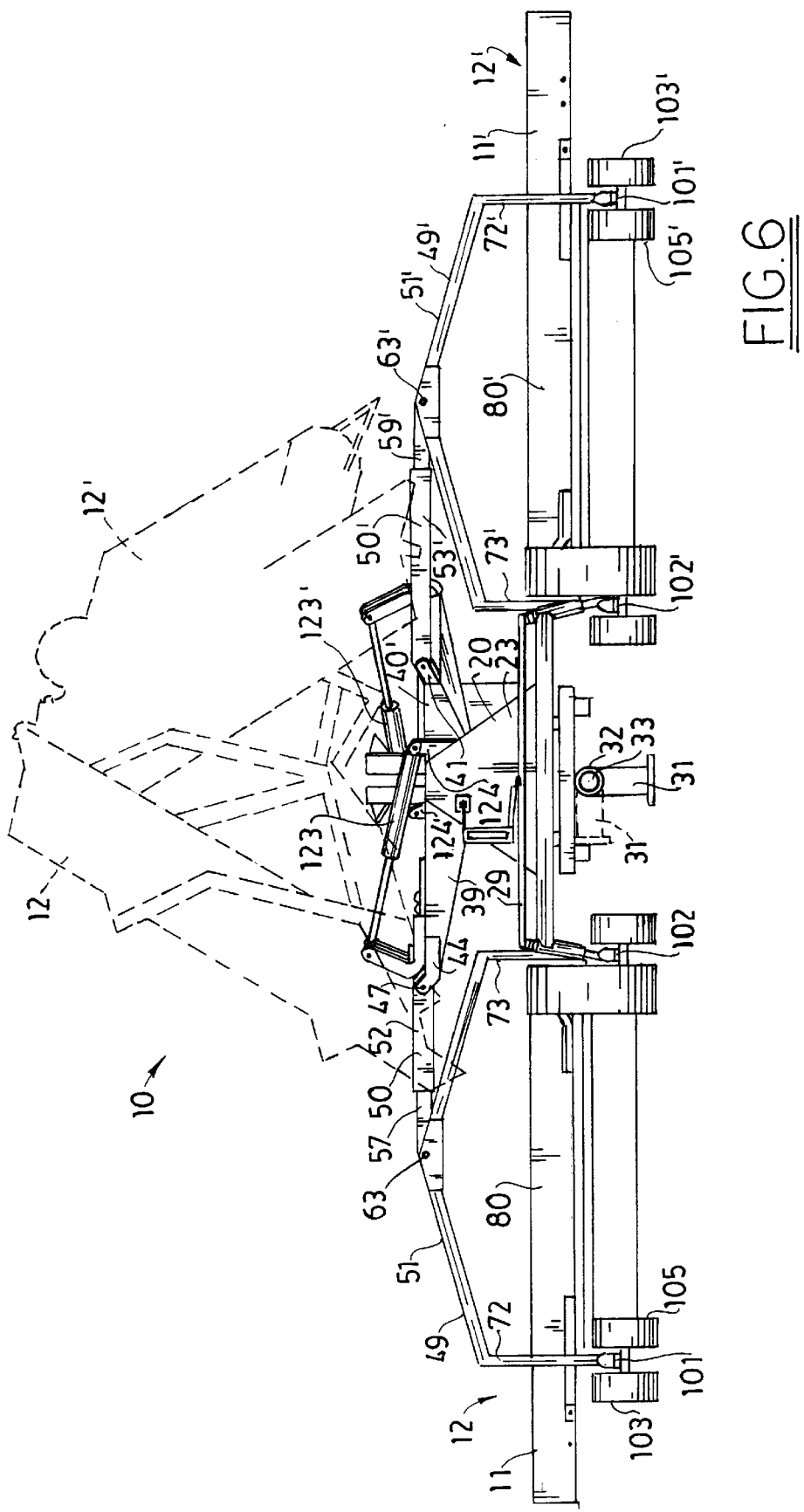
FIG. 6 is a rear elevational view of the improved windrow merging machine with its combined pickup and conveyor units being shown in solid line operating positions and in dotted line stowed positions.

Structure is provided for supporting the front end of machine 10 when it is not connected to a tractor. In this respect, a leg 31 (FIGS. 4 and 6) includes a collar 32 which is pivotally mounted on rod 33 secured to the underside of hitch assembly 22. Leg 31 is rotated to the vertical position (FIGS. 4 and 6) when the merging machine 10 is detached from a tractor 15 to thereby support the front end of the machine. However, after the hitch assembly 22 is connected to the tractor 15 in the conventional manner, leg 31 is rotated to a stowed horizontal dotted line position. A pin arrangement, not shown, extends through aligned holes in collar 32 and rod 33 to retain leg 31 in each of its positions.

Figure 4:
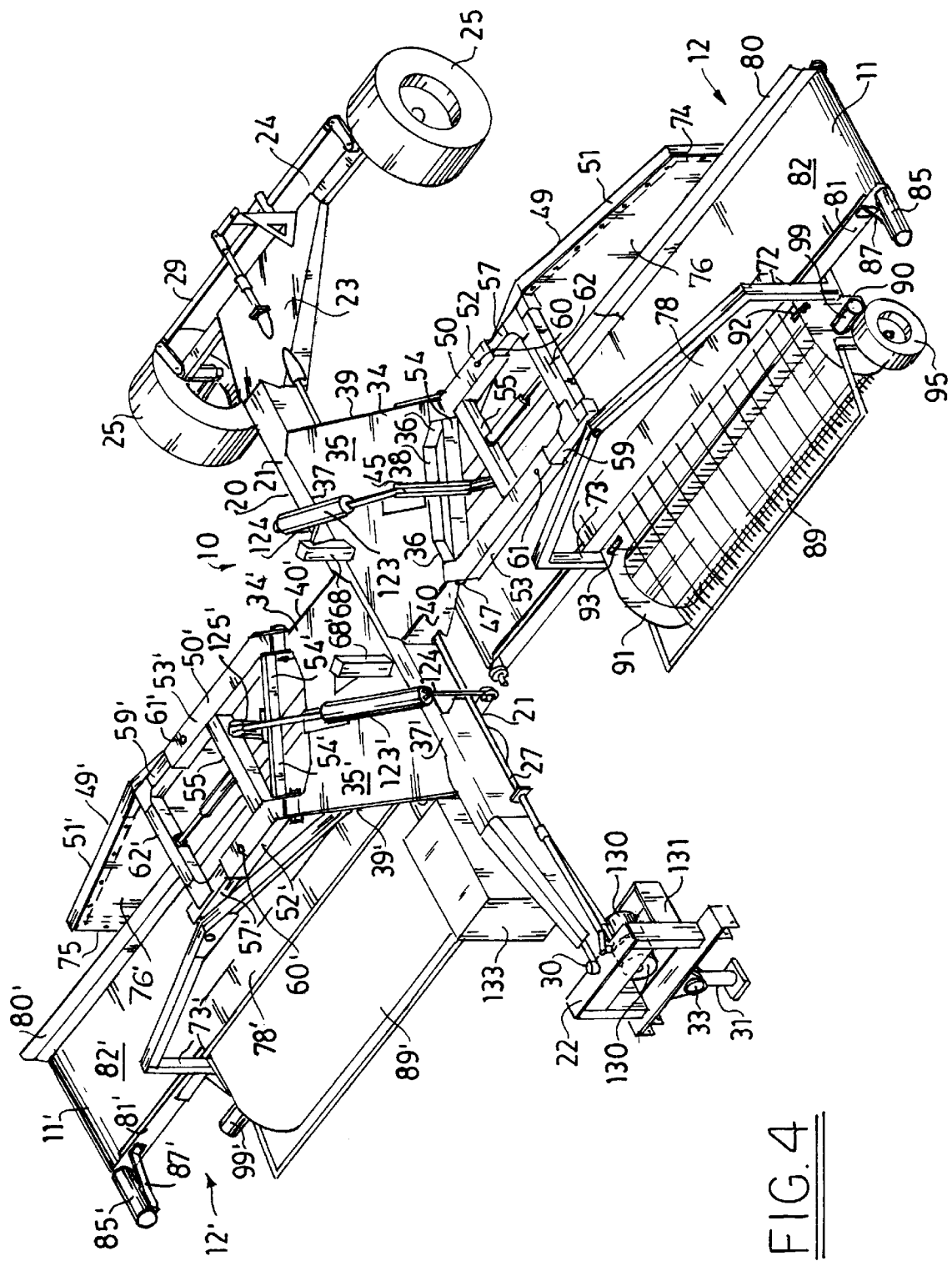
FIG. 4 is a front perspective view of the improved windrow merging machine with its combined pickup and conveyor units extending laterally from the main frame in operating positions.
Figure 5:
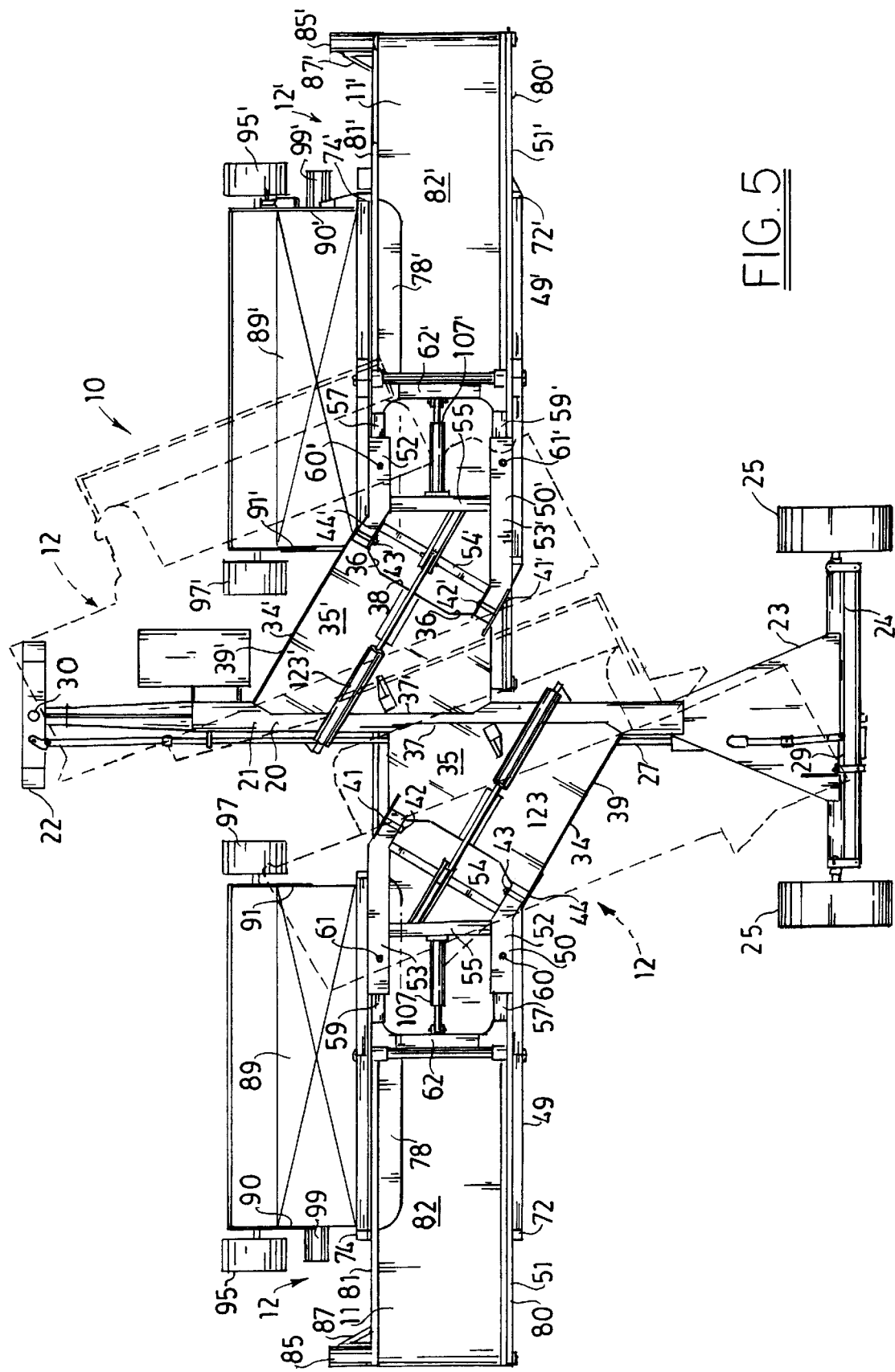
FIG. 5 is a plan view of the improved windrow merging machine showing in solid lines the combined pickup and conveyor units extending laterally from the main frame in operating positions and showing in dotted lines the combined pickup and conveyor units in stowed positions.

Structure is provided for pivotally mounting combined pickup and conveyor units 12 and 12' onto main frame 20. This structure includes wing-like members 34 and 34' which are offset reversed mirror image counterparts, and corresponding parts will be denoted by like unprimed and primed numerals, thereby avoiding the necessity to describe each wing-like members 34 and 34' individually. Wing-like member 34 includes an upper plate 35 having its inner end welded to main frame member 21 at 37. A substantially trapezoidal plate member 39 (FIGS. 3–6) has an end welded to main frame portion 21 and its top edge welded to plate 35. A substantially trapezoidal member 40 has its upper edge welded to plate 35 and its inner edge is welded to main frame member 21. Plates 38 and 36 (FIG. 4) have their upper edges welded to plate 35. Brackets 41' and 42' (FIGS. 5 and 12) extend outwardly from one side of wing-like member 34' and brackets 43' and 44' extend outwardly from the opposite side of wing-like member 34'. A first pin 45' is mounted between brackets 41' and 42' and a second pin 47' is mounted between brackets 43' and 44'. There are corresponding brackets and pins on wing member 34 which are designated by unprimed numerals (FIG. 5).

Figure 12:
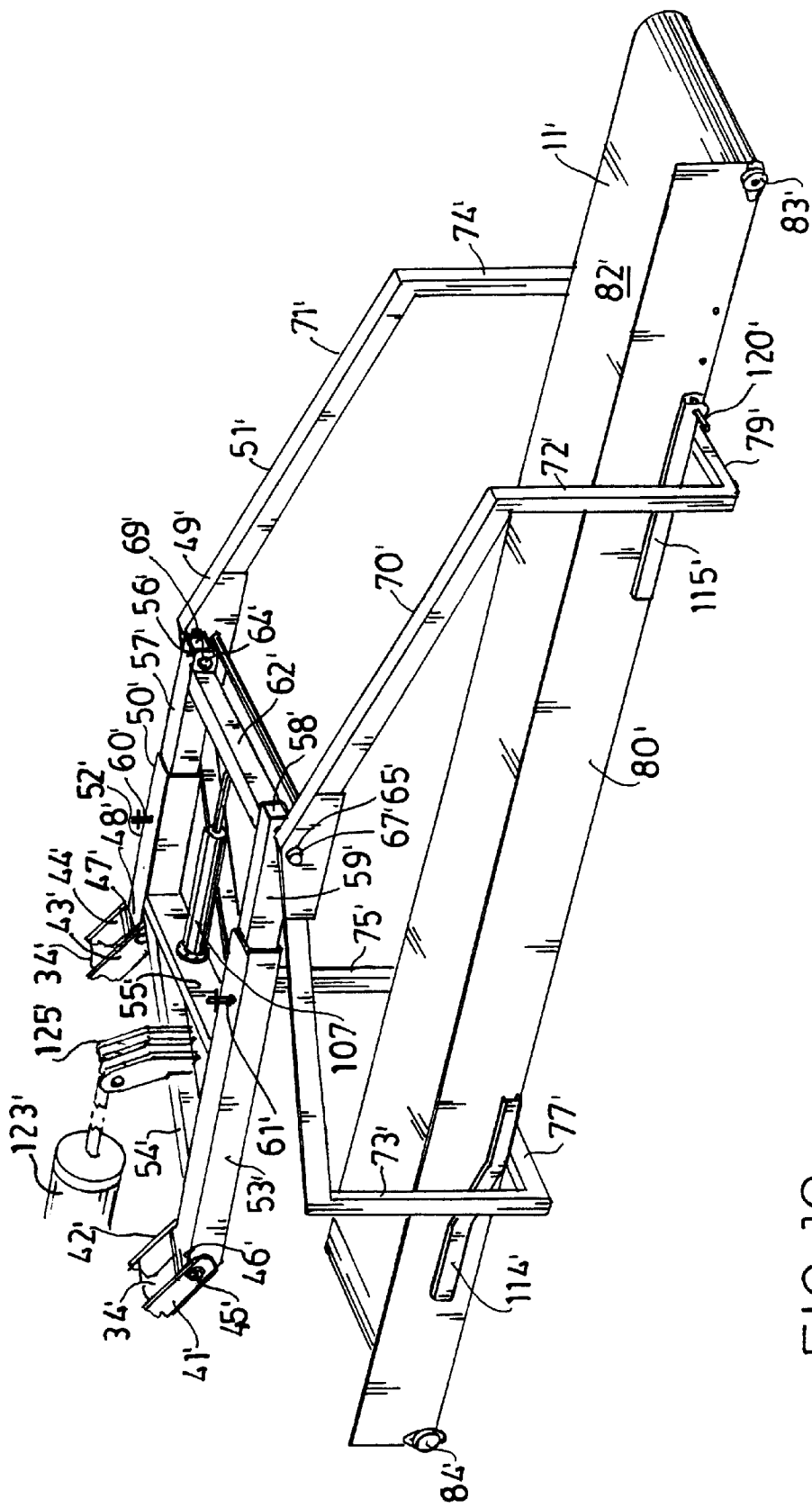
FIG. 12 is a fragmentary perspective view of the pickup-conveyor frame mounting a conveyor.
Figure 13:
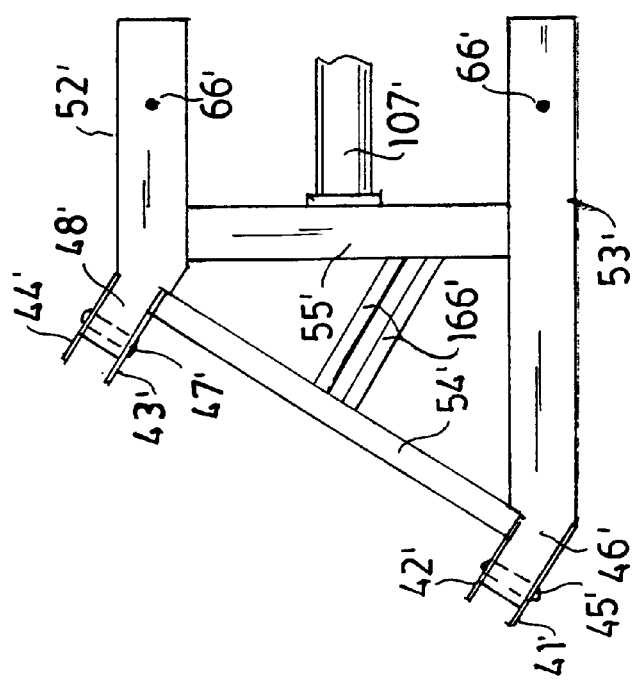
FIG. 13 is a fragmentary plan view of a portion of the first section of the pickup and conveyor frame and the brackets which support it.

The combined pickup and conveyor units 12 and 12' are mounted on pickup-conveyor frames 49 and 49', respectively. The pickup and conveyor frame 49' (FIG. 12) includes a first section 50' (FIGS. 12, 13 and 14) having inner ends 46' and 48' which are pivotally mounted on pins 45' and 47', respectively. The pickup and conveyor frame 49' also includes a second section 51' which is pivotally mounted on the outer end of first section 50'. More specifically, first section 50' of the pickup-conveyor frame includes two arms 52' and 53' (FIGS. 12 and 13). A strut 54' extends between the inner ends of arms 52' and 53', and a strut 55' extends between arms 52' and 53' outwardly of strut 54'. Struts 66' extend between struts 54' and 55'. The first section 50' of the pickup-conveyor frame also includes arms 57' and 59' (FIGS. 12, 13 and 14) which telescope into arms 52' and 53', respectively, and are retained therein by pins 60' and 61' (FIG. 12), respectively, which extend through suitably aligned holes 66' and 68' (FIGS. 13 and 14) in the telescoping arms. The positions of holes 68' relative to holes 66' will determine the positions of the outer end of arms 57' and 59' which support the second section 51' of the pickup-conveyor frame 49' and thus will determine the overall length of first section 50' of the pickup-conveyor frame 49'. A strut 62' has its opposite ends welded to the outer ends of arms 57 and 59.

The second sections 51 and 51' of pickup-conveyor frames 49 and 49', respectively, are pivotally mounted on first sections 50 and 50', respectively. More specifically, arms 57' and 59' have extensions 56' and 58' (FIGS. 12 and 14), respectively. Pins 64' and 65', respectively, extend through extensions 56' and 58', respectively, and through suitable bores 67' and 69' in the upper sides 70' and 71', respectively, (FIG. 7) of second frame section 51'. In addition to the upper sides 70' and 71', second frame section 51' includes legs 72' and 73' which depend downwardly from upper side 70', and it has legs 74' and 75' which depend downwardly from upper side 71'. Strut 77' joins the bottom portions of legs 72' and 74', and strut 79' joins the bottom ends of legs 73' and 75'. Conveyor 11' includes an endless belt 82' which encircles driven roller 83' and idler roller 84'.

Suitable bearings (not shown) are mounted in conveyor sides 80' and 81' which support rollers 83' and 84' for rotation. A belt seal (not shown) is located between the belts 82 and 82' and the inner sides of conveyor sides 80 and 80' to prevent material from dropping through the space therebetween. Flexible flaps 78 and 78' (FIGS. 4 and 8) have sides attached to the sides of pickup mechanisms 89 and 89', respectively, which are adjacent to conveyor sides 81 and 81', respectively, and these flaps overlie parts of the upper runs 82 and 82', respectively, to direct picked up material onto the conveyors. A hydraulic motor 85' (FIG. 4) is mounted on bracket 87' and is suitably coupled to roller 83' in driving relationship therewith. A sheet metal shield 76' (FIGS. 4 and 8) is attached by screws to the sides of legs 72' and 73' and to the side of upper side 70' facing belt 82'. Shield 76' encloses the space within legs 72' and 73' and upper side 70' so as to prevent picked up material from being thrown through this space after it leaves pickup mechanism 89'.

The combined pickup and conveyor unit 12 includes a rotary-tine pickup mechanism 89 which has side plates 90 and 91 which are pivotally mounted on horizontal shafts 92 and 93. Shaft 92 extends inwardly from leg 72 and a mirror image shaft 93 extends inwardly from leg 73 (FIG. 4). Suitable sleeves (not shown) mounted on plates 90 and 91 encircle shafts 92 and 93. Wheels 95 and 97 are mounted on side plates 90 and 91 (FIG. 5), respectively, and as the wheels 95 and 97 follow the contour of the ground, the rotary-tine pickup mechanism will pivot about shafts 92 and 93. The rotary-tine pickup mechanisms 89 and 89' are of the type made by Ford New Holland Corp. and are designated by Model No. 575. Rotary-tine pickup mechanisms of this general type are well known in the art, and therefore a specific description thereof is unnecessary. The rotary-tine pickup mechanism 89 is driven by an hydraulic motor 99 mounted on plate 90. As is understood, rotary-tine mechanism 89' is mounted in an analogous manner.

Walking beam 101 (FIG. 17) is mounted on bracket 100 which extends downwardly from strut 77 and a mirror image walking beam 102 extends downwardly from strut 79. Wheels 103 and 105 are mounted on opposite sides of walking beam 101, which is pivotally mounted on shaft 106, and mirror image wheels are mounted at opposite ends of walking beam 102. Thus each section of frame 51 and 51' has four wheels with two wheels mounted on each walking beam so that second sections 51 and 51' will follow the contour of the ground and pivot about the pins which connect the second sections 51 and 51' to the first sections 50 and 50', respectively.

The second sections 51 and 51' which mount conveyors 11 and 11', respectively, are movable inwardly and outwardly relatively to the main frame 20 to adjust the spacing between the centers of the rotary-tine mechanisms 89 and 89' so that they may be centered on windrows which are spaced different distances apart. To this end an hydraulic motor 107' is mounted between strut 55' and 62' (FIGS. 5, 12, 13 and 14), and when pins 60' and 61' (FIG. 12) are removed, the hydraulic motor 107' can move legs 57' and 59' into and out of legs 52' and 53', respectively, to thereby move second section 51' toward and away from main frame 20. A like adjustment is effected by motor 107 in a like manner. In a machine which was built, the three holes 68' (FIG. 14) were placed six inches apart. When the parts of FIGS. 13 and 14 on both sides of the machine are assembled to their smallest dimension, the pickup mechanisms 89 and 89' are on fourteen foot centers. When they are assembled to their largest dimension, the pickup mechanisms are on sixteen foot centers, and when they are assembled to an intermediate dimension, the pickup mechanisms are on fifteen foot centers.

Figure 9:
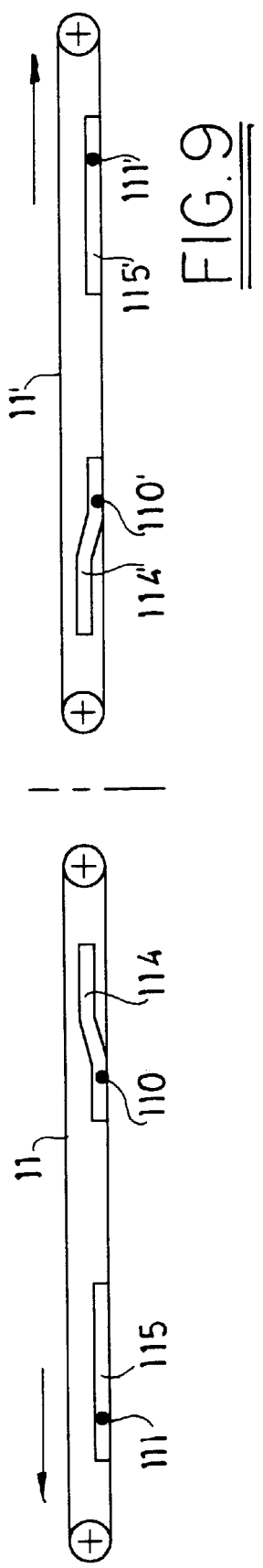
FIG. 9 is a schematic view showing how the two conveyors of the two combined pickup and conveyor units are positioned when the conveyors are driven in opposite directions.

When the windrow merger 10 is being operated in the manner depicted in FIG. 2 with conveyors 11 and 11' being operated in the same direction, one of the conveyors may be termed a discharge conveyor and the other conveyor may be termed a feeding conveyor which feeds lifted windrow to the discharging conveyor. Structure is provided for causing the end of the feeding conveyor which is adjacent to the discharge conveyor to be raised so that the material thereon will drop onto the discharge conveyor. The structure for producing this orientation between the conveyors is shown in FIGS. 7–12. Rollers 110' and 111' are mounted on conveyor side 80' and rollers 112' and 113' are mounted on conveyor side 81'. Channels 114' on 115' are rigidly secured to legs 72' and 73', respectively. Channels 117' and 119', which are mirror images of channels 114' and 115', respectively, are rigidly mounted on legs 74' and 75'. Thus, the rollers 110', 111', 112' and 113', which are mounted on the conveyor 11' and located in their respective channels, support the conveyor 11' on second section 51'. When the rollers and the channels are in the position of FIG. 8, conveyor 11' assumes a perfectly horizontal position, as shown in FIG. 9. However, when it is desired to cause the upper runs 82 and 82' of conveyors 11 and 11', respectively, to move in the same direction, as shown by the arrows in FIG. 10, it is necessary to elevate the discharge end of the feeding conveyor 11' above the adjacent end of the discharging conveyor 11 so that material will not fall through the space between the conveyors. To effect the foregoing, the spring-biased pin 120' (FIG. 12) which is mounted at the end of channel 115' is withdrawn from an aligned hole in conveyor side 80' to thereby unlock conveyor 11' from channel 115'. Thereafter, conveyor 11' can be bodily moved in the direction shown in FIG. 10 from its previous direction of FIG. 9 so that the roller 110' enters the upper portion 116' of channel 114 to thereby elevate the discharge end of conveyor 11' above the adjacent end of conveyor 11. Thus material leaving feeding conveyor 11' will drop onto conveyor 11. If it is desired to elevate the discharge end of conveyor 11 above the adjacent end of conveyor 11', conveyor 11 is moved bodily to the right in FIG. 11 so that roller 110 enters the elevated portion 116' of channel 114'. Thus, material which is discharged from conveyor 11 will drop onto conveyor 11'.

The forgoing description has been directed to the combined pickup and conveyor units 12 and 12' being positioned in substantially horizontal operating positions wherein they pick up windrows. However, structure is also provided for moving the combined units 12 and 12' from their solid positions shown in FIGS. 5 and 6 to their dotted positions shown in these figures so that the machine 10 can be transported to different locations. To this end, hydraulic motors 123 and 123' are provided. One end of hydraulic motor 123 (FIG. 18) is pivotally secured to bracket 124 which is mounted on frame member 21, and the other end is pivotally secured to arm 125 which is rigidly secured to strut 54. Analogous structure is associated with motor 123' (FIG. 12). Thus when hydraulic motor 123 or 123' is actuated, it can move the combined pickup and conveyor units 49 and 49', respectively, between their horizontal operating positions and their vertical stowed positions. When combined pickup and conveyor unit 12' is in its stowed position, arm 53' (FIG. 15) of pickup-conveyor frame 50' rests on triangular member 66' which projects outwardly from post 68' which extends upwardly from plate 35' of wing 34'.

Figure 15:
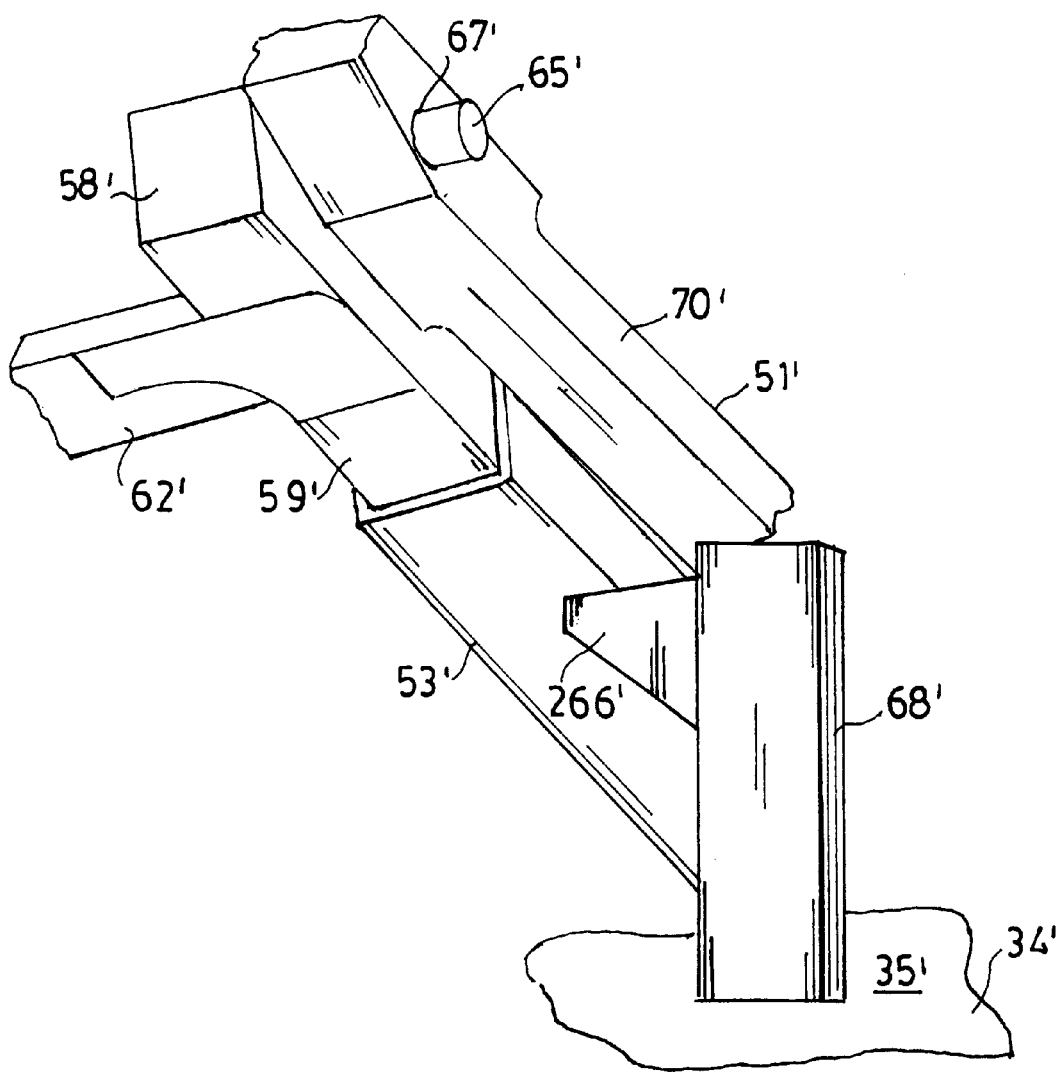
FIG. 15 is a fragmentary perspective view of the manner in which the pickup and conveyor frame is supported in a stowed position.

In FIGS. 15A, 15B and 15C a latch locking mechanism is provided which may be added to the stowing structure shown in FIG. 15 to positively latch a combined pickup and conveyor unit in a stowed position. In this respect, a latch member 140' is pivotally mounted on member 66' at pivot 141'. Latch 140' includes a section 142' which provides a center of gravity which biases latch 140' in a clockwise direction in FIG. 15A when the combined pickup and conveyor unit is not in a stowed position shown in FIG. 15. At this time flange 143' will engage the underside 146' of member 66', and latching tip 144' will be in a position to the right of that shown in FIG. 15A. As arm 53' and frame section 51' move toward the stowing position shown in FIG. 15A, arm 53' will engage side 147' and pivot latch 140' in a counterclockwise direction so that latch head 144' will overlie upper frame side 70'. However, there will be a space between frame side 70' and latching head 144'. When it is desired to move the pickup-conveyor frame in the direction of arrow 147 out of the latched position, as the frame slowly moves in the direction of arrow 147, the weight of section 142' will gradually pivot the latch 140' clockwise in FIG. 15A until latching head clears frame side 70', and ultimately latch 140' will reach its unlatching position wherein flange 143' engages side 146' of member 66'. However, if for any reason a sudden abrupt movement tends to rotate members 70' and 53' in the direction of arrow 147, latch 140' will not move sufficiently fast in a clockwise direction so that latching head 144' can clear frame side 70', and thus, abrupt movements in the direction of arrow 147 will not create an unlatching situation. It will be appreciated that a counterpart latch analogous to latch 140' is used on the corresponding opposite side of the machine.

A machine has been built with the following dimensions. The conveyors 11 and 11' are 14½ feet long and the rotary-tine pickup mechanisms 89 and 89' are approximately 7 feet long. The following dimensions of the various parts are used to cause the machine to operate with the pickup mechanisms 89 and 89' on fourteen foot, fifteen foot and sixteen foot centers. The outboard end of each conveyor frame 80 and 80' has six holes therein. The outermost holes, that is, those closest to the outer ends of the conveyor frame are spaced ten inches from the end of the conveyor frame. The second hole is spaced six inches from the first and the third is spaced six inches from the second. The fourth hole is spaced ten inches from the third. The fifth hole is spaced six inches from the fourth, and the sixth hole is spaced six inches from the fifth hole. Thus, there are two groups of three holes at each outer end of the conveyor frame with the outer three holes and the inner three holes being spaced six inches from each other, and the two groups being spaced ten inches apart. The legs, such as 72' and 73' (FIG. 12) of frame section 51', are spaced eight feet apart. Channels 114' and 115' are affixed to and centered on legs 72' and 73', respectively, and they are each forty inches long. Channels 114 and 115 are located in an analogous manner to legs 72 and 73, respectively. The rollers on the conveyor frame which support the conveyor frame on the channels 114' and 115' are eight feet apart. There is a spring-biased pin 120 and 120' mounted at the end of each channel 115 and 115', respectively, which enters the selected hole in the conveyor frame side 80 and 80', respectively, to hold the conveyor in the desired position to which it has been moved relative to its respective frame. The spring-biased pins 120 and 120' are twenty inches outwardly of legs 72 and 72', respectively, that is, between these legs and the outer ends of the respective conveyors.

Figure 10:
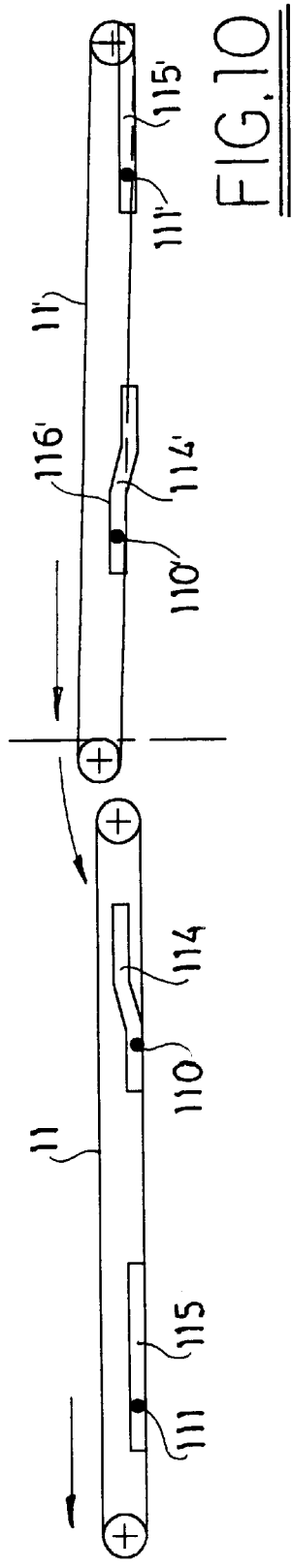
FIG. 10 is a schematic view showing the elevated end of the right conveyor adjacent the end of the other conveyor when both conveyors are driven in the same direction.
Figure 11:
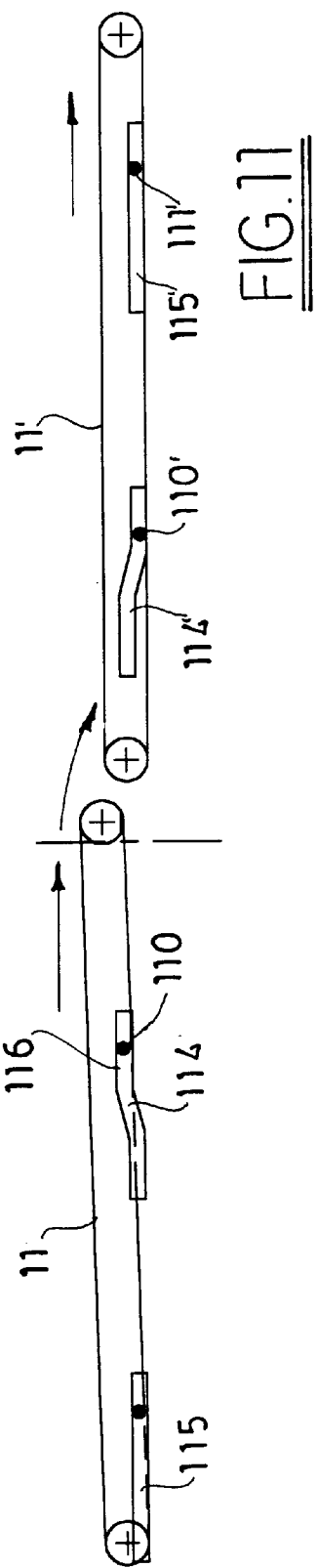
FIG. 11 is a schematic view showing the elevated end of the left conveyor adjacent to the end of the right conveyor when both conveyors are driven in a direction which is opposite to the direction of FIG. 10.
Figure 14:
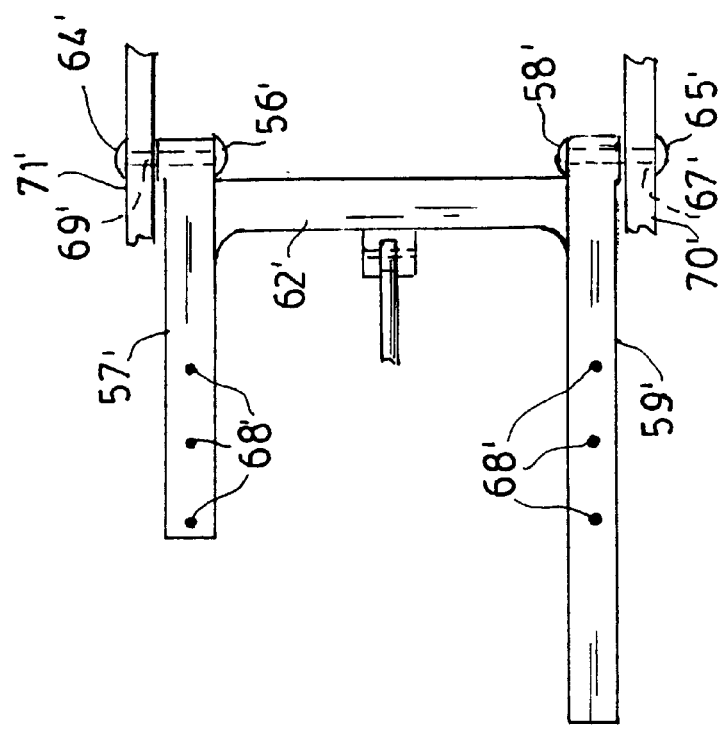
FIG. 14 is a fragmentary plan view of the portion of the first section of the pickup and conveyor frame which telescopes into the portion of FIG. 13 and a portion of the second section of the pickup and conveyor frame.

When the pickup mechanisms are on fifteen foot centers and the conveyors are running to the left in FIGS. 5 and 10, the parts of frame section 50' are adjusted so that the hole 66' (FIG. 13) is aligned with the center hole 68' (FIG. 14). The parts of frame section 50 are adjusted in an analogous manner. Also, the pin 120' on the right channel 115' is in the third hole from the right end of conveyor frame 80', and the pin 120 on the left channel 115 is in the fourth hole from the left end of conveyor 11. At this time the inner end of conveyor 11' (FIG. 10) will be approximately five inches above the adjacent end of conveyor 11 and the inner ends of the conveyors will be approximately five inches apart.

When the pickup mechanisms 89 and 89' are on sixteen foot centers, the parts of frame section 50' are adjusted so that hole 66' are aligned with the leftmost hole 68' in FIG. 14 so that frame section 50' has its largest dimension. An analogous adjustment is made to frame section 50. It is assumed that conveyors 11 and 11' are to run to the left in FIGS. 5 and 10. At this time pin 120' will be in the first hole from the right end of the right conveyor 11', and pin 120 will be in the fourth hole from the left end of the left conveyor.

When the pickup mechanisms 89 and 89' are on fourteen foot centers and the conveyors are to run to the left in FIGS. 5 and 10, hole 66' is aligned with the hole 68' closest to strut 62' so that the frame section has its smallest dimension. Frame section 50 is adjusted in an analogous manner. At this time pin 120' will be in the third hole from the right end of conveyor 11', and pin 120 will be in the sixth hole from the left end of conveyor 11.

When discharging of the material from the conveyors is to be to the right, rather than to the left, as described above, the adjustments of the various parts is reversed.

It will be appreciated that the foregoing explanation of the adjustments for various centers of windrows has been given by way of example and not of limitation, as it is to be understood that merging machines of the present type may have differently spaced holes and different parameters for effecting adjustments.

Figure 18:
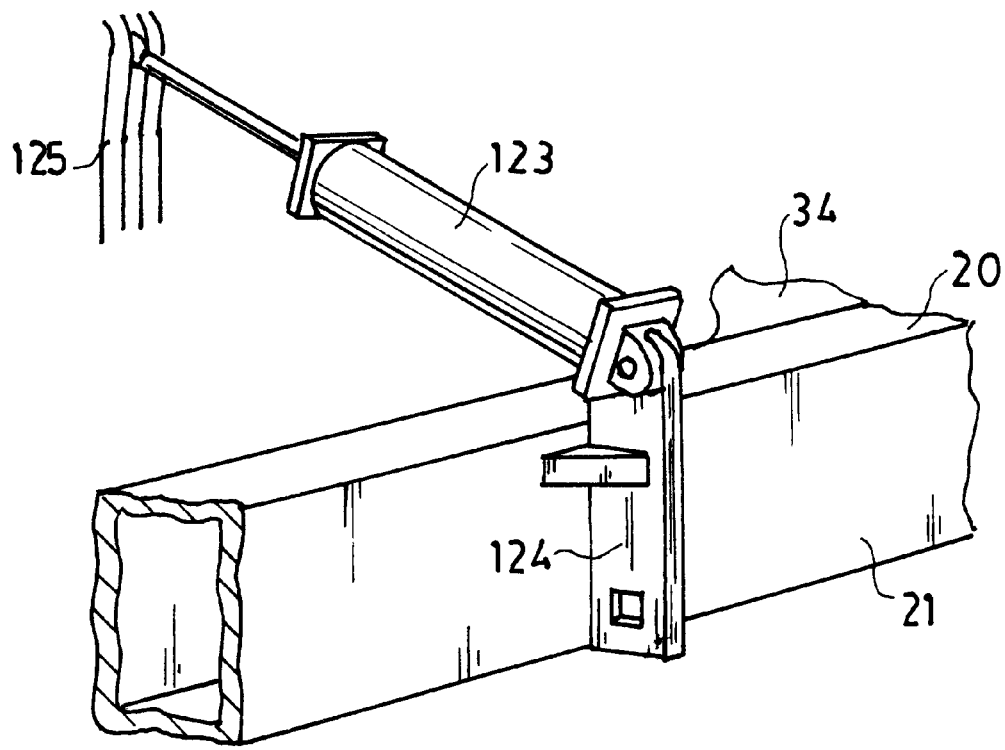
FIG. 18 is a fragmentary perspective view of the structure for mounting on end of the motor for raising and lowering the combined pickup and conveyor units.
Figure 19:
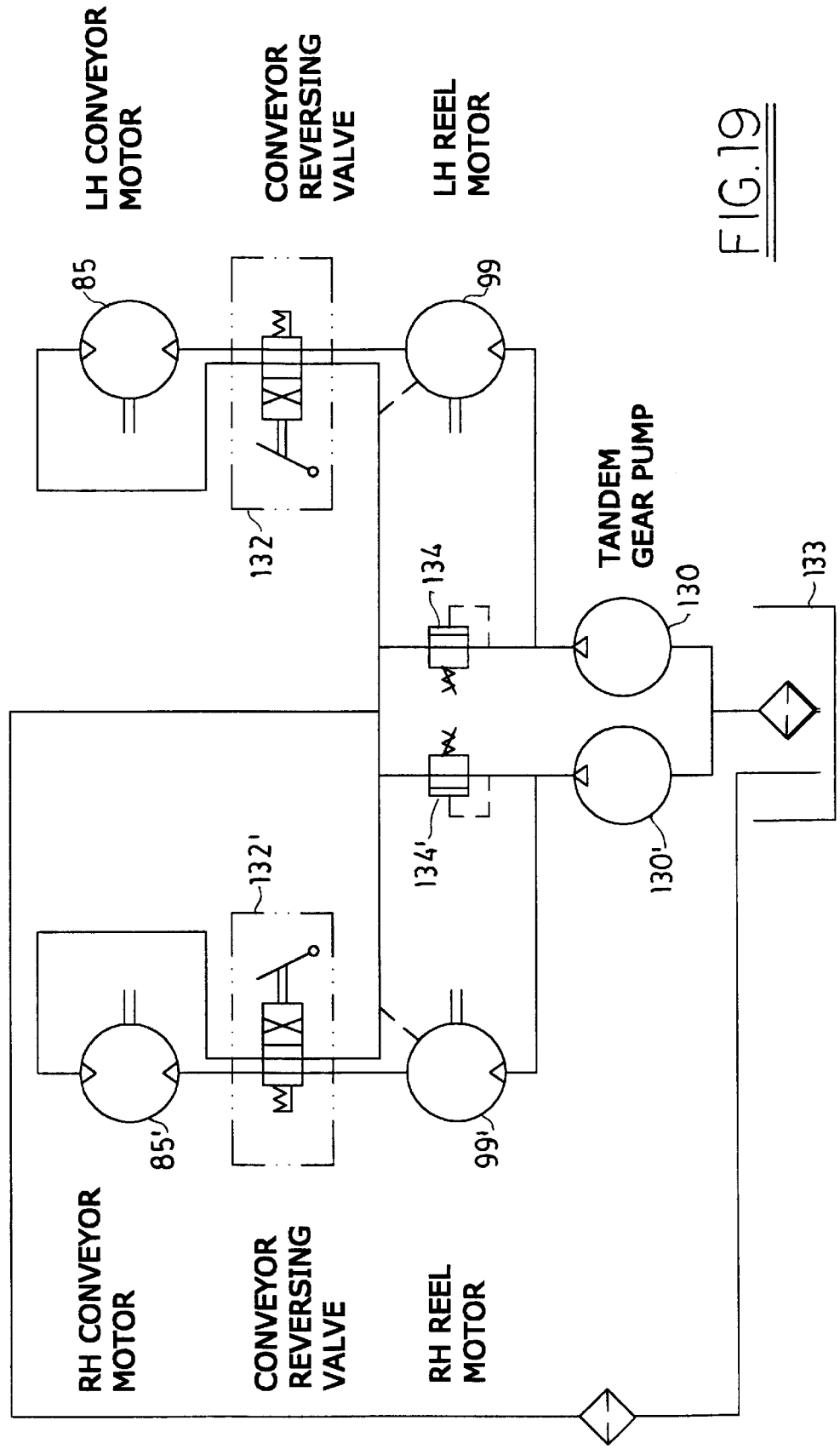
FIG. 19 is a schematic hydraulic diagram for the various hydraulic motors of the combined pickup and conveyor units.

In FIG. 19 the hydraulic circuit for actuating the various motors of the combined pickup and conveyor units 12 and 12' is shown. More specifically, tandem gear pumps 130 and 130' are mounted on base 131 secured to tractor hitch 22. The tandem gear pump arrangement has a conventional coupling (not shown) for receiving the power take-off (not shown) from an associated tractor. Pump 130 drives the unprimed hydraulic motors and pump 130' drives the corresponding primed hydraulic motors. More specifically, pump 130 drives left-hand pickup motor 99 and left-hand conveyor motor 85. A reversing valve 132 is located in the line leading to left-hand conveyor motor 85 so that conveyor 11, which is driven by motor 85, can be driven in both directions. A separate sump 133 is mounted on frame 20 to provide the hydraulic fluid supply. It is to be noted that motors 99 and 85 are in series and further that the motors 99 and 99' are not reversible, as are motors 85 and 85', because the mechanisms 89 and 89' must always be driven in the same direction to lift windrows onto conveyors 11 and 11'. Relief valves 134 and 135 are positioned between the outlets of the tandem gear pumps 130 and 130', respectively, to pass hydraulic fluid directly into conduit 135 leading to sump 133, in the event that, for any reason, the pressure at the outlets of pumps 130 and 130' exceeds a predetermined value. The primed motors 85' and 99' are driven in an analogous manner. The conduits between pumps 130 and 130' and the various motors with which they are associated, as described in FIG. 18, are not shown in the figure which show the actual mechanism structure of the windrow merging machine 10.

Also it is to be noted that the piston and cylinder type of hydraulic motors 123, 123', 107 and 107' which are used in conjunction with pickup-conveyor frames 49 and 49' have a separate hydraulic circuit which is not shown in the drawings. This hydraulic circuit constitutes suitable conduits connected to opposite ends of each of the cylinders of these motors, and each of these conduits is connected by means of a quick-disconnect coupling to a conduit leading from the hydraulic circuit of the tractor which has valving associated therewith for supplying and exhausting hydraulic fluid from these motors to drive them in opposite directions.

While hydraulic motors have been disclosed, it will be appreciated that electrical motors can be used in appropriate instances, or mechanical drives such as rack and pinions may be used instead of motors 107 and 107'; and chain drives may be used to drive the rotary-tine pickups.

It can thus be seen that the improved windrow merging machine 10 of the present invention is manifestly capable of achieving the above-enumerated objects, and while preferred embodiments of the present invention have been disclosed, it will be appreciated that it is not limited thereto but may be otherwise embodied within the scope of the following claims.

What is claimed is:

1. A windrow merging machine comprising a main frame, first and second pickup mechanisms mounted on opposite sides of said main frame, first and second substantially axially aligned conveyors extending outwardly from opposite sides of said main frame proximate said first and second pickup mechanisms, respectively, inner and outer ends on said first and second conveyors, and said inner end of said first conveyor being elevated above said Inner end of said second conveyor.

2. A windrow merging machine as set forth in claim 1 including first and second motors coupled to said first and second conveyors, respectively.

3. A windrow merging machine as set forth in claim 1 wherein said first pickup mechanism and said first conveyor comprises a first combined pickup and conveyor unit, and wherein said second pickup mechanism and said second conveyor comprises a second combined pickup and conveyor unit.

4. A windrow merging machine as set forth in claim 3, including a first pickup-conveyor frame mounting said first combined pickup and conveyor unit on said main frame and a second pickup-conveyor frame mounting said second combined pickup and conveyor unit on said main frame.

5. A windrow merging machine comprising a main frame, first and second pickup mechanisms mounted on opposite sides of said main frame, first and second conveyors mounted on opposite sides of said main frame proximate said first and second pickup mechanisms, respectively, first and second motors coupled to said first and second conveyors, respectively, inner and outer ends on said first and second conveyors, said inner end of said first conveyor being elevated above said inner end of said second conveyor, and control means for driving at least one of said first and second motors in opposite directions.

6. A windrow merging machine comprising a main frame, first and second pickup mechanisms mounted on opposite sides of said main frame, first and second conveyors mounted on opposite sides of said main frame proximate said first and second pickup mechanisms, respectively, said first pickup mechanism and said first conveyor comprising a first combined pickup and conveyor unit, said second pickup mechanism and said second conveyor comprising a second combined pickup and conveyor unit, a first pickup-conveyor frame mounting said first combined pickup and conveyor unit on said main frame, a second pickup-conveyor frame mounting said second combined pickup and conveyor unit on said main frame, and said first and second pickup-conveyor frames being pivotally mounted on first and second pivot axes, respectively, on said main frame.

7. A windrow merging machine as set forth in claim 6 wherein said main frame has a longitudinal axis, and wherein said first and second pivot axes are skewed relative to said longitudinal axis.

8. A windrow merging machine as set forth in claim 7 wherein said first and second pickup-conveyor frames are pivotable about said first and second pivot axes, respectively, whereby said first and second combined pickup and conveyor units, respectively, can be positioned in substantially horizontal operating positions and more vertical stowed positions.

9. A windrow merging machine as set forth in claim 8 wherein said first and second pickup-conveyor frames each include first sections pivotally mounted on said main frame, and second sections mounting said combined pickup and conveyor units.

10. A windrow merging machine as set forth in claim 9 wherein said second sections are pivotally mounted on said first sections.

11. A windrow merging machine as set forth in claim 10 wherein at least one of said first and second pickup-conveyor units is mounted on said second sections for bodily movement in a transverse direction relative to said main frame.

12. A windrow merging machine as set forth in claim 10 wherein at least one of said first sections couples at least one of said second sections for movement in a transverse direction relative to said main frame.

13. A windrow merging machine as set forth in claim 10 wherein both of said pickup-conveyor units are mounted on said second sections for movement in a transverse direction relative to said main frame.

14. A windrow merging machine as set forth in claim 13 wherein said first sections couple said second sections for movement in a transverse direction relative to said main frame.

15. A windrow merging machine comprising a main frame, first and second pickup mechanisms mounted on opposite sides of said main frame, first and second conveyors mounted on opposite sides of said main frame proximate said first and second pickup mechanisms, respectively, said first pickup mechanism and said first conveyor comprising a first combined pickup and conveyor unit, said second pickup mechanism and said second conveyor comprising a second combined pickup and conveyor unit, a first pickup-conveyor frame mounting said first combined pickup and conveyor unit on said main frame, a second pickup-conveyor frame mounting said second combined pickup and conveyor unit on said main frame, said first and second pickup-conveyor frames being pivotally mounted on first and second pivot axes, respectively, on said main frame, and said first and second pickup-conveyor frames being pivotable about said first and second pivot axes, respectively, to cause said first and second combined pickup and conveyor units, respectively, to be positioned in substantially horizontal operating positions and more vertical stowed positions.

16. A windrow merging machine as set forth in claim 15 wherein said first and second pickup-conveyor frames each include first sections pivotally mounted on said main frame, and second sections mounting said combined pickup and conveyor units.

17. A windrow merging machine as set forth in claim 16 wherein said second sections are pivotally mounted on said first sections.

18. A windrow merging machine as set forth in claim 17 wherein at least one of said first and second pickup-conveyor units is mounted on said second sections for bodily movement in a transverse direction relative to said main frame.

19. A windrow merging machine as set forth in claim 18 wherein at least one of said first sections couples at least one of said second sections for movement in a transverse direction relative to said main frame.

20. A windrow merging machine as set forth in claim 16 wherein both of said pickup-conveyor units are mounted on said second sections for movement in a transverse direction relative to said main frame.

21. A windrow merging machine as set forth in claim 20 wherein said first sections couple said second sections for movement in a transverse direction relative to said main frame.

22. A windrow merging machine comprising a main frame, first and second pickup mechanisms mounted on opposite sides of said main frame, first and second conveyors mounted on opposite sides of said main frame proximate said first and second pickup mechanisms, respectively, said first pickup mechanism and said first conveyor comprising a first combined pickup and conveyor unit, said second pickup mechanism and said second conveyor comprising a second combined pickup and conveyor unit, a first pickup-conveyor frame mounting said first combined pickup and conveyor unit on said main frame, a second pickup-conveyor frame mounting said second combined pickup and conveyor unit on said main frame, said first and second pickup-conveyor frames each including first sections pivotally mounted on said main frame, and second sections mounting said combined pickup and conveyor units.

23. A windrow merging machine as set forth in claim 22 wherein said second sections are pivotally mounted on said first sections.

24. A windrow merging machine as set forth in claim 23 wherein at least one of said first and second pickup-conveyor units is mounted on said second sections for bodily movement in a transverse direction relative to said main frame.

25. A windrow merging machine as set forth in claim 24 wherein at least one of said first sections couples at least one of said second sections for movement in a transverse direction relative to said main frame.

26. A windrow merging machine as set forth in claim 22 wherein both of said pickup-conveyor units are mounted on said second sections for movement in a transverse direction relative to said main frame.

27. A windrow merging machine as set forth in claim 26 wherein said first sections couple said second sections for movement in a transverse direction relative to said main frame.

28. A windrow merging machine as set forth in claim 22 wherein at least one of said second sections is mounted on a first section for movement in a transverse direction relative to said frame.

29. A windrow merging machine as set forth in claim 28 wherein the conveyor of said at least one of said second sections is movable on said second section in a transverse direction relative to said frame.

30. A windrow merging machine as set forth in claim 28 wherein one of said conveyors of said first and second combined pickup and conveyor units is movable on its respective second section in a transverse direction relative to said frame.

31. A method of merging windrows which are positioned in spaced rows which extend in substantially the same direction comprising the steps of lifting first and second adjacent windrows from the ground and depositing them onto a third windrow to create a first accumulation of windrows; and after said third windrow has been formed subsequently raising fourth and fifth adjacent windrows which are adjacent onto said first accumulation of windrows and depositing them onto said first accumulation of windrows to thereby create a second accumulation of windrows consisting of said first, second, third, fourth and fifth windrows.

32. A windrow merging machine comprising a main frame, first and second pickup mechanisms mounted on opposite sides of said main frame, first and second substantially axially aligned conveyors extending outwardly from opposite sides of said main frame proximate said first and second pickup mechanisms, respectively, a first frame mounting said first conveyor on a first skewed axis on said main frame, and a second frame mounting said second conveyor on a second skewed axis on said main frame.

33. A windrow merging machine comprising a main frame, first and second pickup mechanisms mounted on opposite sides of said main frame, first and second substantially axially aligned conveyors extending outwardly from opposite sides of said main frame proximate said first and second pickup mechanisms, respectively, and a frame mounting said first conveyor on a skewed axis on said main frame.

34. A windrow merging machine comprising a main frame, first and second pickup mechanisms mounted on opposite sides of said main frame, first and second conveyors mounted on opposite sides of said main frame proximate said first and second pickup mechanisms, respectively, said first pickup mechanism and said first conveyor comprising a first combined pickup and conveyor unit, said second pickup mechanism and said second conveyor comprising a second combined pickup and conveyor unit, a first pickup-conveyor frame mounting said first combined pickup and conveyor unit on said main frame, a second pickup-conveyor frame mounting said second combined pickup and conveyor unit on said main frame, at least one of said first and second conveyors being movable on its respective pickup-conveyor frame toward the other of said first and second conveyors, and a track on said respective pickup-conveyor frame for elevating the end of said at least one of said first and second conveyors which is adjacent the other of said first and second conveyors as it approaches a position adjacent the other of said first and second conveyors.

35. A windrow merging machine comprising a main frame, first and second pickup mechanisms mounted on opposite sides of said main frame, first and second conveyors mounted on opposite sides of said main frame proximate said first and second pickup mechanisms, respectively, said first pickup mechanism and said first conveyor comprising a first combined pickup and conveyor unit, said second pickup mechanism and said second conveyor comprising a second combined pickup and conveyor unit, a first pickup-conveyor frame mounting said first combined pickup and conveyor unit on said main frame, a second pickup-conveyor frame mounting said second combined pickup and conveyor unit on said main frame, both of said first and second conveyors being movable on said first and second pickup-conveyor frames, respectively, toward the other of said first and second conveyors, and first and second tracks on said first and second pickup-conveyor frames, respectively, for raising the ends of said first and second conveyors, respectively, as they approach a position adjacent the other of said first and second conveyors.

36. A method of merging windrows which are positioned in spaced rows comprising the steps of lifting first and second adjacent windrows from the ground; conveying said first and second windrows in opposite directions; and depositing said first and second windrows proximate to third and fourth windrows, respectively, which are adjacent to said first and second windrows, respectively, to thereby create a first accumulation consisting of said first and third windrows and a second accumulation consisting of said second and fourth windrows.

37. A method as set forth in claim 36 wherein said first and second adjacent windrows are lifted substantially simultaneously and deposited substantially simultaneously on said third and fourth windrows, respectively.

38. A windrow merging machine comprising a main frame, first and second pickup mechanisms mounted on opposite sides of said main frame, first and second conveyors mounted on opposite sides of said main frame proximate said first and second pickup mechanisms, respectively, a first conveyor frame mounting said first conveyor on said main frame, a second conveyor frame mounting said second conveyor on said main frame, said first conveyor frame including a first section mounted on said main frame and a second section mounting said first conveyor on said first section, and said second section being mounted on said first section for transverse movement relative to said main frame.

39. A windrow merging machine as set forth in claim 38 wherein said first conveyor is mounted on said second section for movement relative to said second section in a transverse direction relative to said main frame.

40. A windrow merging machine as set forth in claim 39 including a reversible motor coupled to said first conveyor.

41. A windrow merging machine as set forth in claim 38 wherein said second conveyor frame includes a third section mounted on said main frame and a fourth section mounting said second conveyor on said third section, and said fourth section being mounted on said third section for transverse movement relative to said main frame.

42. A windrow merging machine as set forth in claim 41 wherein said second conveyor is mounted on said fourth section for movement relative to said fourth section in a transverse direction relative to said main frame.

43. A windrow merging machine as set forth in claim 42 including a reversible motor coupled to said first conveyor.

44. A windrow merging machine as set forth in claim 42 wherein said first conveyor is mounted on said second section for movement relative to said second section in a transverse direction relative to said main frame.

45. A windrow merging machine as set forth in claim 44 including a first reversible motor coupled to said first conveyor, and a second reversible motor coupled to said second conveyor.

46. A windrow merging machine comprising a main frame, first and second pickup and conveyor units mounted on opposite sides of said main frame, each of said pickup and conveyor units including a windrow pickup member and a conveyor, first mounting means for mounting at least one of said pickup and conveyor units for movement transversely relative to said frame, and second mounting means for mounting said at least one of said conveyors for movement transversely relative to said frame independently of said first mounting means.

47. A windrow merging machine as set forth in claim 46 including third mounting means for mounting the other of said conveyor and pickup units for movement transversely of said frame, and fourth mounting means for mounting the other of said conveyors for movement transversely of said frame independently of the movement of said third mounting means.

48. A windrow merging machine as set forth in claim 47 including a reversible motor coupled to each of said conveyors.

49. A windrow merging machine as set forth in claim 47 including pivot means for pivotally mounting said at least said one of said pickup and conveyor units on said frame.

50. A windrow merging machine as set forth in claim 49 wherein said pivot means mounts said at least one of said pickup and conveyor units on a skewed axis relative to said frame.

51. A windrow merging machine as set forth in claim 48 including pivot means for pivotally mounting said first and third mounting means on said main frame.

52. A windrow merging machine as set forth in claim 51 wherein said pivot means comprise skewed axes between said main frame and said first and third mounting means.

53. A windrow merging machine comprising a main frame, first and second pickup mechanisms mounted on opposite sides of said main frame, first and second substantially axially aligned conveyors extending outwardly from opposite sides of said main frame proximate said first and second pickup mechanisms, respectively, and inner ends on said first and second conveyors adjacent each other proximate a lower portion of said main frame.

54. A windrow merging machine comprising a main frame, first and second conveyors, a first conveyor frame mounting said first conveyor on one side of said main frame, a second conveyor frame mounting said second conveyor on the opposite side of said main frame in substantial alignment with said first conveyor, said first conveyor frame including a first section mounted on said main frame and a second section mounting said first conveyor on said first section, and said second section being mounted on said first section for transverse movement relative to said main frame.

55. A windrow merging machine as set forth in claim 54 wherein said first conveyor is mounted on said second section for movement relative to said second section in a transverse direction relative to said main frame.

56. A windrow merging machine as set forth in claim 55 including a reversible motor coupled to said first conveyor.

57. A windrow merging machine as set forth in claim 54 wherein said second conveyor frame includes a third section mounted on said main frame and a fourth section mounting said second conveyor on said third section, and said fourth section being mounted on said third section for transverse movement relative to said main frame.

58. A windrow merging machine as set forth in claim 57 wherein said second conveyor is mounted on said fourth section for movement relative to said fourth section in a transverse direction relative to said main frame.

59. A windrow merging machine as set forth in claim 58 including a reversible motor coupled to said first conveyor.

60. A windrow merging machine as set forth in claim 58 wherein said first conveyor is mounted on said second section for movement relative to said second section in a transverse direction relative to said main frame.

61. A windrow merging machine as set forth in claim 60 including a first reversible motor coupled to said first conveyor, and a second reversible motor coupled to said second conveyor.

* * * * *